E. G. TODT.
FOUNDRY MOLDING MACHINE.
APPLICATION FILED NOV. 20, 1913.
1,126,916.
Patented Feb. 2, 1915.
3 SHEETS—SHEET 1.
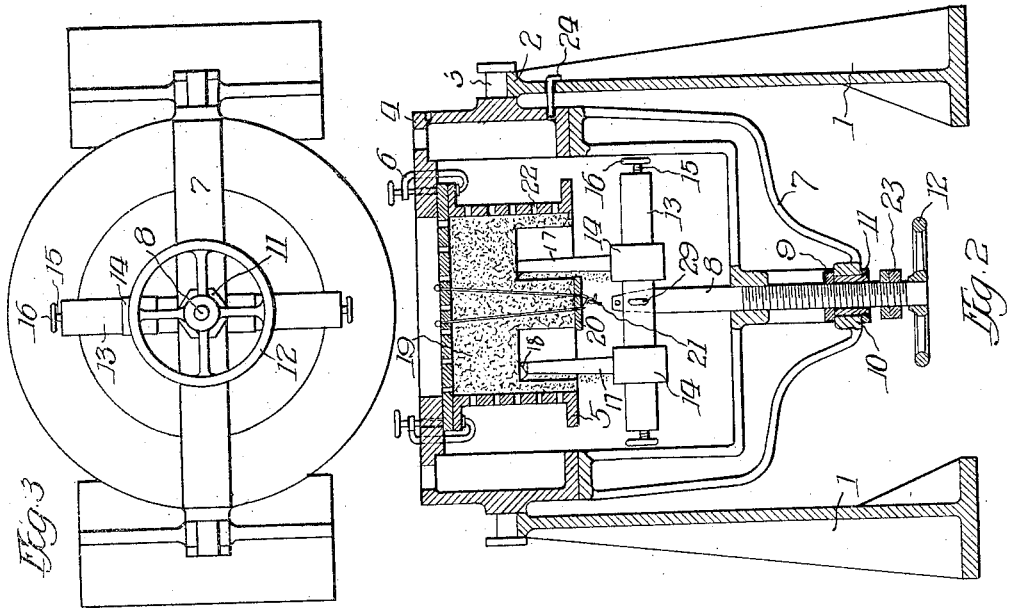
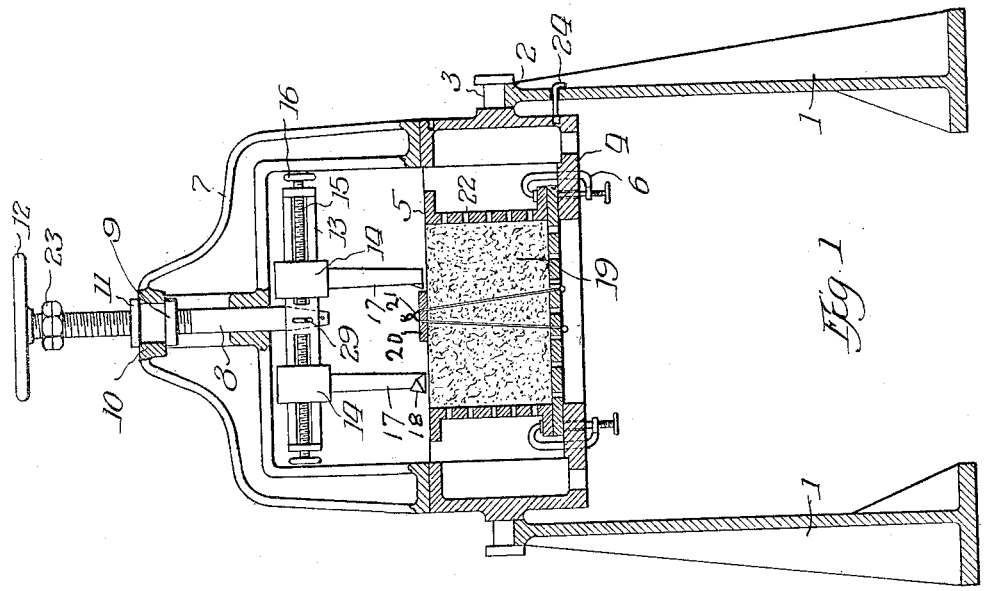
Witnesses:
Geo. C. Davison
R. Burkhardt
Inventor
E. G. Todt
By W. E. Williams
Atty.

E. G. TODT.
FOUNDRY MOLDING MACHINE.
APPLICATION FILED NOV. 20, 1913.

1,126,916.

Patented Feb. 2, 1915.
3 SHEETS—SHEET 2.

Witnesses:

Inventor
E. G. Todt
By W. E. Williams
Atty.

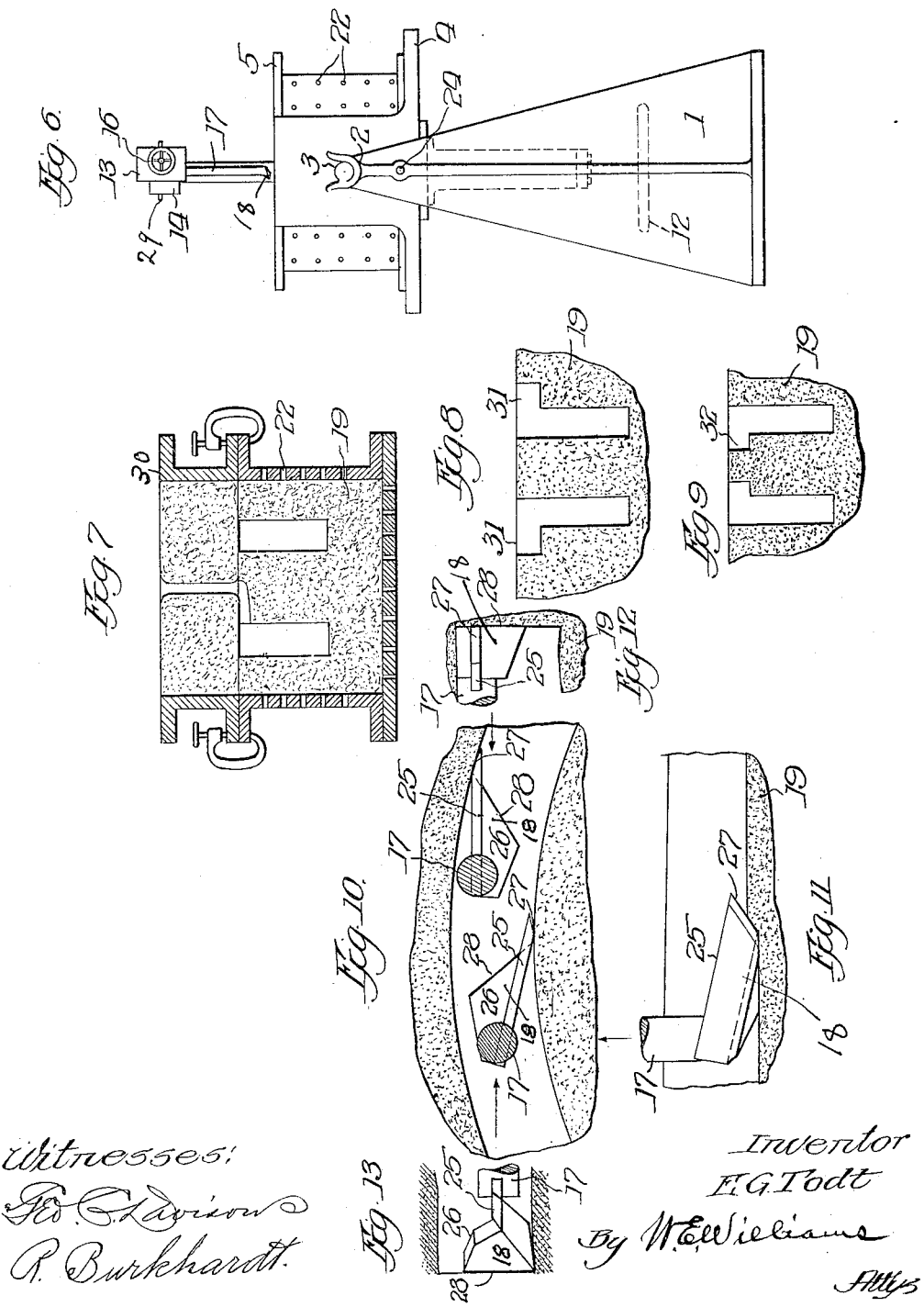

UNITED STATES PATENT OFFICE.

EDWARD GEORGE TODT, OF CHICAGO, ILLINOIS.

FOUNDRY MOLDING-MACHINE.

1,126,916.    Specification of Letters Patent.    Patented Feb. 2, 1915.

Application filed November 20, 1913. Serial No. 802,172.

*To all whom it may concern:*

Be it known that I, EDWARD G. TODT, a citizen of the United States, residing at Chicago, in the county of Cook and State of Illinois, have invented a new and useful Improvement in Foundry Molding - Machines, of which the following is a specification.

My invention relates chiefly to machines that sweep out or cut out of the sand or molding body, the shape of the desired casting to be made and is especially desirable for making bushings, short tubes, and articles of a uniform shape whereby a cutting or sweeping tool may be made to travel the outline of the article to be made.

The object of my invention is to provide means for making cheaply and without patterns articles that vary in size in such a manner that a large stock of patterns would otherwise be needed and further to make clean, solid, smooth castings of exact shape and size.

In the foundry art the ramming and withdrawal of the pattern deforms the mold to more or less extent and my invention avoids this.

Reference will be had to the accompanying drawings in which I have shown two designs of machines, one of them adapted to make bushings and other articles having relatively a large hole in the center usually cored out and the other suitable for articles with a small or no " core hole " at all.

Figure 4:
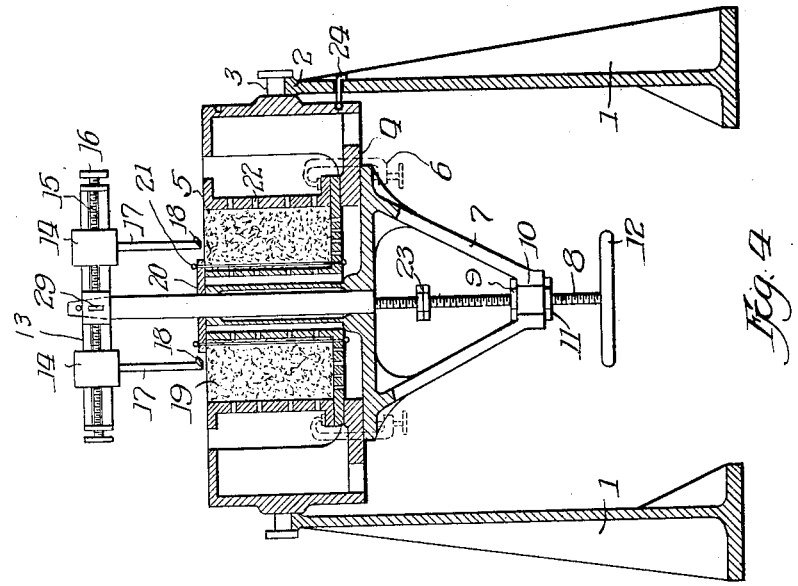
Figure 5:
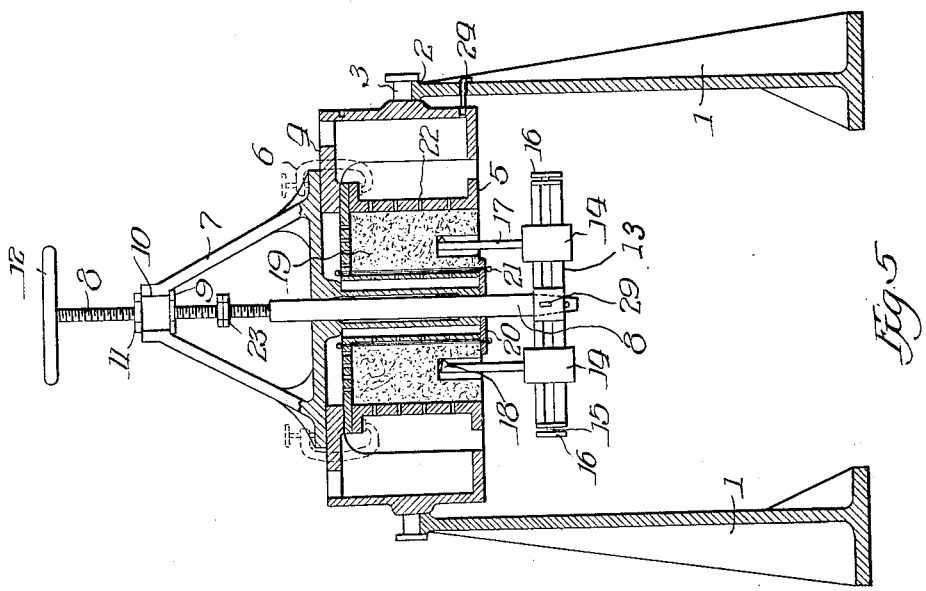

Figures 1, 2, and 3 show the machine used when small central "core holes" are required in the articles. Fig. 1 is a vertical elevation partly in section in position just prior to the commencement of sweeping or cutting out the pattern. Fig. 2 is a similar view to that of Fig. 1 when the machine is in the operation of sweeping the form. Fig. 3 is a plan of Fig. 1. Figs. 4, 5, and 6 show the machine used when large central " core holes " are permitted. Fig. 4 shows the machine partly in section in position just prior to the commencement of the cutting or sweeping out of the form in the mold. Fig. 5 shows a similar view to that of Fig. 4 but in position of operating. Fig. 6 is a side elevation of Fig. 4. Fig. 7 is a sectional detail of a flask ready to mold. Figs. 8 and 9 are forms of molds for bushings made on the machine. Figs. 10, 11, 12 and 13 show details of the cutting tools of the sweep.

The only substantial difference between the machine shown in Figs. 1, 2 and 3 from that shown in Figs. 4, 5 and 6 lies in the arrangement of the actuating mechanism. In Figs. 1, 2, and 3, the operator works below the flask when sweeping and in Figs. 4, 5, and 6, the operating mechanism is above the flask when the sweeping is going on.

The machines are made with any suitable frame or stands 1 provided with trunnion bearings 2 adapted to support the trunnions 3 of any suitable table or platen 4. The table or platen 4 is adapted to receive and have fastened thereto by any suitable means any suitable molding flask 5, which is here shown as being fastened to the table 4 by clamps 6 and may be removed and replaced as desired in the operation of the machine. Fixed to table 4 there is a supporting girder casting 7, designed to hold a screw shaft 8 threaded through a nut 9 journaled in a suitable bearing 10 in the girder 7. The nut 9 is clamped in its journal by a nut 11 screwed onto the head of the nut 9 itself so that it is at all times held against revolving by a small amount of frictional resistance. The screw shaft 8 is provided with a hand operating wheel 12 of any suitable form by which the operator turns the shaft 8 when desired. Mounted on the end of shaft 8 by detachable means as desired there is a cross head or sweep head 13 to which there are attached adjustable blocks 14 held in sliding contact with the cross head and adjusted across the cross head by the screws 15 actuated by the hand wheels 16. The blocks 14 carry the sweep arms 17 on the ends of which are fixed the sweeping cutters 18 of any suitable form but I prefer to use the form shown in the drawings.

The operation of the machine is thus: A suitable flask 5 is placed on the table 4 and clamped in position shown in Figs. 1, 3, and 4. It is then filled with the molding sand 19 suitably rammed and the top slicked off by a straight edge to the level of the top of the flask. A disk 20 is then fastened in the center at the location of the core when a bushing or other article with a central hole is desired to be made. The disk 20 is fastened in place by wires 21 that run through the sand to the bottom of the flask. The sand is then pierced for the escape of the gas of casting by any suitable rod or needle inserted through the holes 22 in the sides and bottom of the flask and also in the top surface as desired. Then the cutter sweep arms 17 are adjusted across the cross head 13 so that one of them will cut the line of the inside wall of the bushing to be formed and the other the outside wall. Then the locking nuts 23 which are on the shaft 8 are set at the right location to limit the travel of the screw shaft 8 to the depth of the bushing desired to be made. Then the bolt 24 in the frame 1 which holds the table 4 from turning on its trunnions is released and the table is revolved turning the flask upside down in a manner that the sand to be cut out will fall out by gravity when loosened. The hand wheel 12 is then turned in a direction to cause the screw of shaft 8 to carry the cutting or sweep arms 17 into the sand of the flask. The thread of this screw causes the cutters 18 to cut the advance of a single thread at each revolution of the wheel and the loosened sand drops out leaving a clean hole as the sweeping and cutting takes place. The nuts 23 will finally jam against the nut 9 when the sweeping and cutting has reached the desired depth of hole to form the desired length of bushing or mold and on further turning the jam of the nuts 23 on the nut 9 will carry nut 9 around with the shaft 8 causing the sweep arms 17 with their cutters 18 to revolve without advancing farther into the sand and thus smooth or slick out the swept hole making a smooth surface to receive the molten metal. The cutters 18 are made with a cutting lip or edge 25 cutting the vertical wall of the sand and a cutting lip or edge 26 cutting the front face or heading of the sweep hole. The lip 25 is shaped at 27 on its cutting edge to press down or under the cutting edge as it moves forward any small bits of roots or pieces of wire or other foreign substances that are found in the sand and the lip 26 is tapered at 28 obliquely to the line of travel in a manner also to press down and over to the clear space in the swept hole any such bits of foreign substances. The shape of these cutters is a little like a plow only that the edges push the obstruction down and in the sand in a manner to leave a clean sand wall and not tear rough holes in the walls of the swept cavity.

In Figs. 4, 5, and 6 the shaft 8 runs through the table 4 and has the cross head 13 on the other side of the table from that of the hand wheel 12. This permits the operator to avoid the dropping sand when turning the wheel in the operation of sweeping and cutting. The cross head 13 is fastened to the shaft 8 by any suitable easily detachable means and I here show it as fastened by a wedge key or pin block 29 since with the design shown in Figs. 4, 5, and 6 the cross head 13 must be removed when the flasks 5 are changed as in this design the shaft 8 passes through the center of the flask and through what may be termed the core of the mold. The function of molding sand is to stick together and the best kinds of it are such that it is practically impossible to sweep a mold and blow or lift the sand all out after it is loosened by a sweep when the mold is open from the top only as any sand that falls loose from the sweep again attaches itself to the sand surface that it may fall upon before it is removed from the cavity. By my machine the sand falls clear of the mold the instant that it is released by the sweeping and cutting and leaves an exact smooth surface to receive the metal of casting which is a great desideratum.

Castings made in molds made by my machines are cleaner, smoother, more exact in size and freer from blow holes and pin hole defects than are castings made from molds wherein patterns are used to form the spaces for castings. After the mold is cut out and the flask removed a cope piece 30 Fig. 7 which has been previously prepared, vented and gated is placed on the flask and secured thereto ready for pouring the casting. When flanges are desired on the casting as is shown by 31 and 32 Figs. 8 and 9, the arms 17 of the sweep are adjusted laterally by turning the screws 15 through the medium of the hand wheel 16 which moves the blocks 14 radially to the shaft 8.

What I claim is:

1. A machine for cutting out mold forms, mounted in manner to hold and holding a molding flask in position to be filled with mold material from the top, a suitable flask held by the machine; means, located on the same side of the flask as that from which the latter is filled with the mold material, for cutting out the mold form; said flask and cutting means adapted to be revolved to position where gravity will remove the material loosened by the cutting means.

2. A machine for sweeping and cutting out mold forms, composed of a suitable supporting frame provided with journals or bearing supporting parts, a platen or frame adapted to hold a molding flask and mounted on an axis supported by the frame and adapted to revolve on the axis, a screw shaft mounted on the platen or frame and adapted to be revolved in relation to the flask and carrying a cross head on which are mounted the sweep or cutter arms.

3. A machine for sweeping and cutting out mold forms composed of a suitable supporting frame provided with journals or bearing supporting parts, a platen or frame adapted to hold a molding flask and provided with an axis adapted to be supported by the journals or bearing supporting parts of the main frame and said platen or frame adapted to be revolved on its axis, a screw shaft mounted on the platen or frame and adapted to be revolved in relation to the flask and carrying a cross head on which are mounted the sweep or cutter arms said sweep or cutter arms adjustable on the cross head.

4. A machine for sweeping or cutting out patterns in molds, composed of a table or platen adapted to hold a flask for molding and mounted to revolve on an axis, a screw shaft mounted upon the table or platen and adapted to revolve in relation to the flask on the table or platen, a cross head mounted on the screw shaft, blocks mounted by adjustable means in a manner to be moved across the cross head to and from the screw shaft, sweep arms connected with the adjustable blocks and carrying cutting or abrading ends adapted to loosen and remove sand from the flask as the screw shaft is revolved.

5. A machine for sweeping or cutting out mold forms composed of a table adapted to support a flask, a screw threaded shaft mounted on the table and adapted to revolve in relation to the mold form, means carried by the shaft for cutting out the mold material, the table flask and shaft adapted to be revolved from an upright to an inverted position.

6. A machine for sweeping or cutting out mold forms composed of a table adapted to support a flask, a screw threaded shaft mounted on said table and adapted to revolve in relation to the mold form, means carried by the shaft for cutting out the mold material, the table flask and shaft mounted to be revolved bodily within the frame of the machine.

7. A machine for sweeping or cutting out mold forms, composed of a table or platen adapted to hold a molding flask for the mold material, a shaft mounted to revolve in relation to the flask, screw threads on the shaft, a nut on the thread of the shaft and carried in a bearing box in the mounting for the shaft, a frictional resistance for holding the nut against revolving in its bearing box in the mounting, an adjustable lock nut on the thread of the shaft, cutters or sweep members carried by the shaft and adapted to sweep or cut out the mold material as the shaft revolves and advances under the influence of the screw thread.

8. A machine for sweeping or cutting out mold forms, composed of a table or platen adapted to hold a molding flask for the mold material, a shaft mounted to revolve in relation to the flask, screw threads on the shaft, a nut on the threads of the shaft and carried in a bearing box in the mounting for the shaft, a frictional resistance for holding the nut against revolving in its bearing box in the mounting, an adjustable lock nut on the thread of the shaft, cutters or sweep members carried by the shaft and adapted to sweep or cut out the mold material as the shaft revolves and advances under the influence of the screw thread, with a frame or supporting means for the whole that permits turning the flask upside down during the sweeping or cutting operation.

9. A machine for sweeping or cutting out mold forms in mold material, composed of a platen or table adapted to hold a flask of mold material, a shaft mounted to revolve in relation to the flask, sweep or cutter arms adjustably mounted on the shaft, sweeping or cutting terminals for the arms shaped with oblique cutting edges whereby bits of wire, roots or other obstructions are crowded by the terminals into the mold material or out into free escape without necessarily being severed by the sweeping or cutting terminals.

10. A machine for sweeping or cutting out mold cavities in mold material composed of a table or platen adapted to hold a flask for the mold material, said table or platen mounted in a manner to be turned bottom side up, a shaft mounted to the table or platen and adapted to revolve in relation thereto and extending through the table, sweep or cutter arms mounted on said shaft and located on one side of the table or platen, actuating means for the shaft located on said shaft on the opposite side of the table or platen from that of the sweep arms.

In witness whereof I have hereunto signed my name in the city of Chicago and the county of Cook on this 14th day of July 1914 in the presence of two subscribing witnesses.

EDWARD GEORGE TODT.

Witnesses:
MARTIN E. CAIN,
PETER P. FOLLMER.

Copies of this patent may be obtained for five cents each, by addressing the "Commissioner of Patents, Washington, D. C."